(12) United States Patent
Malinasky, Jr.

(10) Patent No.: US 9,091,094 B2
(45) Date of Patent: Jul. 28, 2015

(54) HEAD FOR IN-FLOOR POOL CLEANING SYSTEM

(75) Inventor: Paul Gerald Malinasky, Jr., Scottsdale, AZ (US)

(73) Assignee: Blue Square Manufacturing, LLC, Gilbert, AZ (US)

( * ) Notice: Subject to any disclaimer, the term of this patent is extended or adjusted under 35 U.S.C. 154(b) by 1207 days.

(21) Appl. No.: 12/941,993

(22) Filed: Nov. 8, 2010

(65) Prior Publication Data

US 2011/0225716 A1    Sep. 22, 2011

Related U.S. Application Data

(60) Provisional application No. 61/316,270, filed on Mar. 22, 2010.

(51) Int. Cl.
*E04H 4/00* (2006.01)
*E04H 4/16* (2006.01)
*B05B 3/16* (2006.01)
*B05B 15/10* (2006.01)
*F16K 11/074* (2006.01)

(52) U.S. Cl.
CPC *E04H 4/169* (2013.01); *B05B 3/16* (2013.01); *B05B 15/10* (2013.01); *E04H 4/1681* (2013.01); *F16K 11/074* (2013.01)

(58) Field of Classification Search
CPC .................................................. E04H 4/169
USPC ....................................... 4/490, 492
See application file for complete search history.

(56) References Cited

U.S. PATENT DOCUMENTS

| | | | | |
|---|---|---|---|---|
| 3,018,788 A * | 1/1962 | Perlis | ............ | 137/331 |
| 3,408,006 A * | 10/1968 | Stanwood | ........ | 239/66 |
| 3,715,078 A * | 2/1973 | Reynolds | ........ | 239/206 |
| 4,116,216 A * | 9/1978 | Rosenberg | ...... | 137/624.13 |
| 4,220,283 A * | 9/1980 | Citron | ............ | 239/205 |
| 6,848,124 B2 * | 2/2005 | Goettl | .......... | 4/490 |
| 7,571,496 B2 * | 8/2009 | Martin | .......... | 4/490 |

* cited by examiner

*Primary Examiner* — Huyen Le
(74) *Attorney, Agent, or Firm* — Kilpatrick Townsend & Stockton LLP

(57) ABSTRACT

A cleaning head for an in-floor pool cleaning system includes a sleeve with a top opening and an insert configured to be retained within the sleeve. The insert has a first body portion with an aperture wherein the first body portion is configured to fit through the top opening, and a second body portion that is configured to not fit through the top opening. A passage runs through the insert to the aperture. The insert has a first position in which it is retained in the sleeve. When water pressure is applied to the bottom of the cleaning head, the insert is moved upward to a second position so the aperture extends beyond the top opening in the sleeve and pressurized water exists the aperture to move debris. The cleaning head also includes a conical spring to bias the insert towards the first position.

14 Claims, 10 Drawing Sheets

HEAD FOR IN-FLOOR POOL CLEANING SYSTEM

PRIORITY CLAIM

This application claims priority to U.S. Provisional Application No. 61/316,270 entitled "In Floor Pool Cleaning System," and filed on Mar. 22, 2010, the disclosure of which that is not inconsistent with this specification is incorporated herein by reference.

FIELD OF THE INVENTION

The present invention is directed to cleaning heads for in-floor pool cleaning systems.

BACKGROUND OF THE INVENTION

In-floor pool cleaning systems have been developed that clean the inner surfaces of a pool by using pressurized bursts of water from cleaning heads mounted in the floor, sides and/or steps of the pool to move debris (which includes dirt, leaves and other material in the pool) into one or more drains where vacuum pulls the debris into a filtering system. A pump, a distribution valve connected to the pump, and one or more cleaning heads connected to the distribution valve are used in a typical in-floor cleaning system. The pump delivers pressurized water into the distribution valve, which directs the pressurized water to successively control the operation of one or more cleaning heads at a time.

In a conventional distribution valve, fluid, such as water, enter a cavity of the distribution valve (or "valve") through an inlet port and exit through outlet ports. In one such known design, each of the outlet ports is covered by a corresponding outlet valve that is opened or closed in response to the operation of an impeller positioned inside the cavity and connected to a gear reduction mechanism. As the impeller rotates, the gear reduction mechanism rotates to drive a cam system that sequentially opens and closes each individual outlet valve to open and close the corresponding outlet port.

A problem with this design is that a relatively large force must be applied by the gear reduction mechanism to turn the cam that opens and closes each individual outlet valve. Moreover, over time, as mineral deposits build up on the outlet valves and/or the cam surface, the valves become increasingly more difficult to open and close, thus requiring even more force to turn the cam. Further, the torque required from the gear reduction mechanism creates stress in each of the distribution valve components, and specifically in the gears themselves. This stress results in increased wear and tear, which shortens the life span of the components. Increased wear and tear also adds to the operational costs due to more frequent maintenance, repair, and replacement of parts, and leads to down time required to perform such tasks.

Other disadvantages of such conventional distribution valves are their size and the number of moving parts. First, the relatively large size of conventional valves requires more material to manufacture the valve, which leads to an increase in the overall cost. Second, for the known distribution valve previously described, it includes not only the moving parts of the gear reduction mechanism, but a separate outlet valve for each of the outlet ports, and these respective valves that must repeatedly open and close in order for water to move through the corresponding outlet port. The relatively large number of moving parts increases manufacturing costs, leads to more malfunctions, downtime and makes it more difficult to replace damaged components.

Another drawback of the conventional distribution valve described herein is restricted fluid flow and fluid blow-by. When in the open position, the outlet valve still restricts the amount of fluid that flows through the associated outlet port. In addition, when closed, the outlet valve does not sufficiently seal the outlet ports that are not in use. Thus, the closed valves still permit some fluid to pass into the corresponding outlet ports, thus reducing the pressure of fluid exiting the open outlet port and decreasing the efficiency of the pool cleaning system. An increase in pump horsepower, and the power consumption of the pump, is required to maintain operational requirements. Conventional distribution valves thus often require larger pumps that demand more power than might otherwise be necessary if they operated more efficiently. Consequently, there is a need for an improved distribution valve.

Cleaning heads are known and they typically consist of an outer sleeve and an insert that fits within the sleeve. Cleaning heads are mounted in the floor, side or steps of a pool and are preferably flush with the pool surface. When pressurized water is diverted by the valve to a particular cleaning head (or group of cleaning heads), the pressurized water enters the insert and pushes the insert partially out of the sleeve so that the opening in the insert extends beyond the sleeve. The insert has an aperture through which pressurized water flows in order to push debris towards a drain. Sometimes the inserts remain stuck in the out position, where people can step on them and hurt themselves and/or break the insert.

SUMMARY OF THE INVENTION

A cleaning head for an in-floor pool cleaning system is disclosed. The head comprises these basic components: (1) a sleeve with a top opening and a bottom opening, (2) an insert positioned within the sleeve, and (3) a biasing element. The sleeve is preferably a generally cylindrical, plastic component with a bottom end for mounting into the floor of a pool and a top end that is preferably flush with the pool surface when the cleaning head is installed. The sleeve has an opening in the bottom (the "bottom opening") and a smaller opening in the top (the "top opening"). The sleeve fits into a collar, which is a preferably a generally cylindrical housing that is placed in the floor side, or step of a pool as the pool is being constructed. The collar includes a water stop, which is preferably a circular flange, on its upper edge. In a preferred embodiment the water stop has a plurality of grooves to better adhere to material (usually a type of concrete) used to form or secure the surface of the pool and prevent leakage from around the water stop.

The insert preferably has a first body portion that is juxtaposed the second opening and a second body portion juxtaposed the first opening, the second body portion being wider than the first body portion. The first body portion is configured to fit through the top opening of the sleeve, while the second body portion is configured to not fit through the top opening of the sleeve. The insert also has an aperture in the first body portion and a passage running through the second body portion and the first body portion to the aperture. The insert has a first position wherein it is retained within the sleeve and a second position wherein the aperture of the first body portion extends beyond the top opening.

The biasing element is preferably a conical spring surrounding at least part of the first body portion of the insert and preferably rests (or is positioned) on an upper ledge of the second body portion. The biasing element biases the insert towards the first position wherein it is retained within the sleeve, and could be any structure suitable for this purpose.

The cleaning head is moved from its first position to its second position by pressurized water being applied to the second body portion at the bottom of the sleeve. As the pressurized water enters the passage of the body portion, the pressure overcomes the pressure exerted by the biasing element and the insert moves from the first position to the second position wherein the aperture in the first body portion extends beyond the opening in the top of the sleeve. Pressurized water exits the aperture to move debris in the pool towards a location (such as a drain) where it can be collected by a filtering device. When the distribution valve discontinues directing pressurized water to the head, the pressure from the biasing element assists in moving the insert from the second position back to the first position.

The cleaning head also has an indexing component that indexes the insert as it moves from one or both of the second position to the first position or the first position to the second position. In a preferred embodiment, the indexing component comprises teeth, or grooves formed in the insert (preferably in the first body portion), and one or more pins in the wall of the sleeve. The teeth engage the one or more pins as the insert moves from the first position to the second position and back, which causes the insert to index so that pressurized water is applied to different portions of the pool floor as the insert indexes to different positions.

DETAILED DESCRIPTION OF PREFERRED EMBODIMENTS

Figure 1:
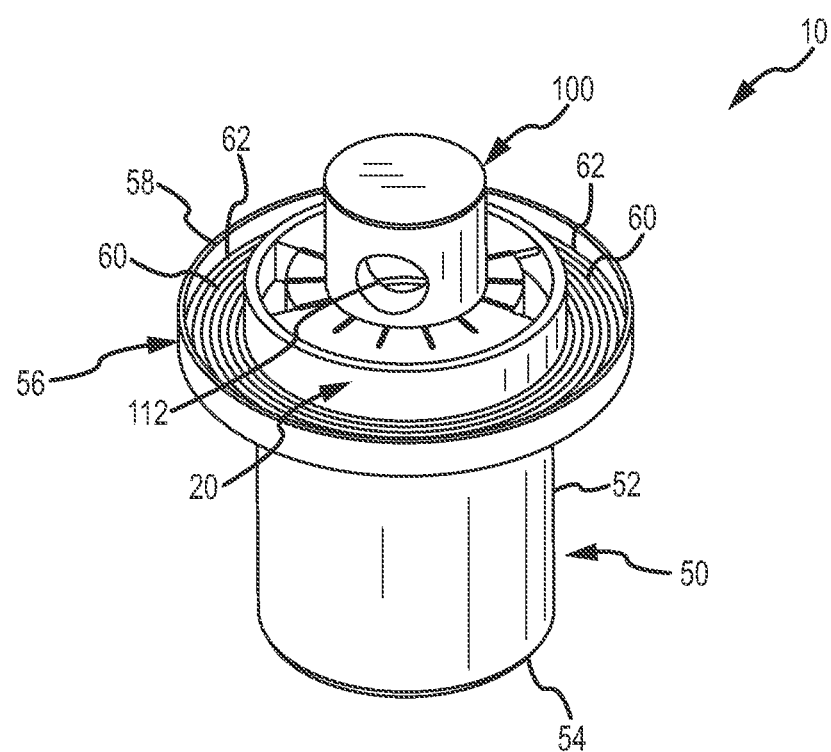
FIG. 1 is a perspective view of a cleaning head in accordance with aspects of the invention when the cleaning head is in its second position.

Turning now to the drawings, where the purpose is to describe a preferred embodiment of the invention and not limit same, FIGS. 1, 2, 3 and 3A show a cleaning head (or "head") 10 according to a preferred embodiment of the invention. Cleaning head 10 generally comprises three components: a sleeve 20, an insert 100 and a biasing element 200. Sleeve 20 and insert 100 are comprised of any suitable material, preferably plastic, and most preferably ABS with 20% barium sulfate fibers by weight. The function of the sleeve 20 is to mount into a collar 50, which is already mounted in the floor, side or steps of a pool and to retain the insert 100. Any suitable structure for this function may be used.

Figure 1A:
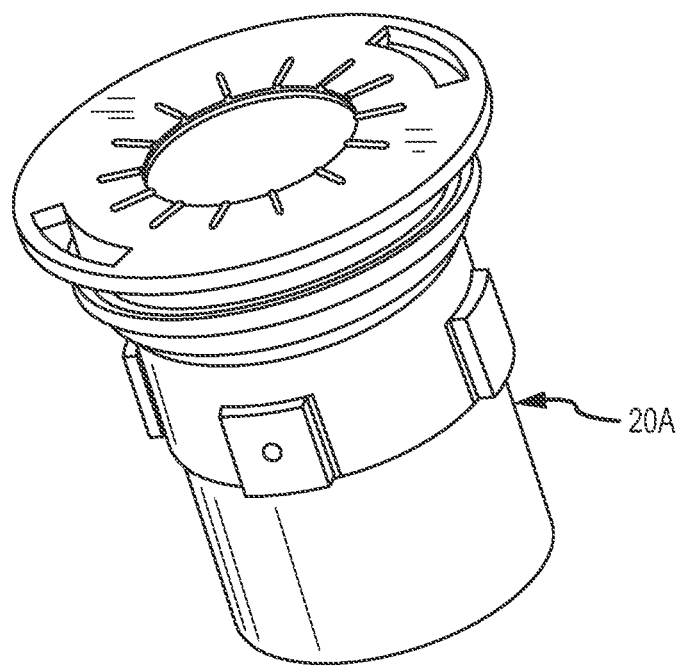
FIG. 1A is a perspective view of an alternate embodiment of the invention having a different sleeve.
Figure 1B:
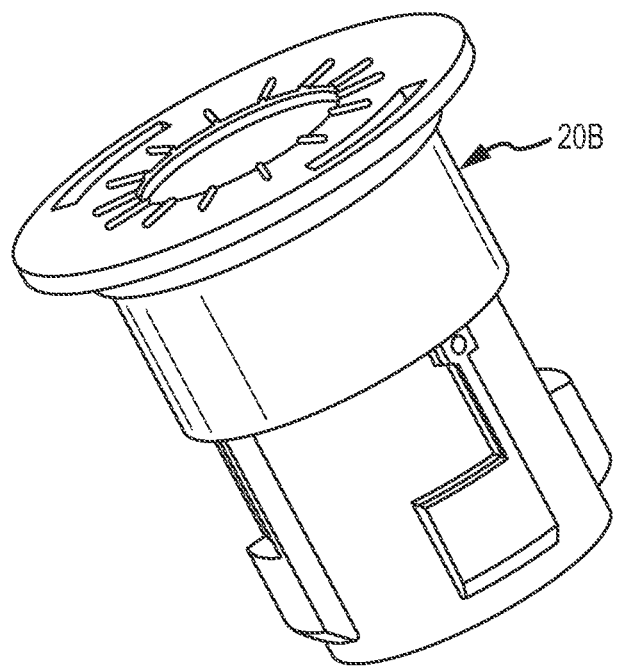
FIG. 1B is a perspective view of another alternate embodiment of the invention having a different sleeve.
Figure 1C:
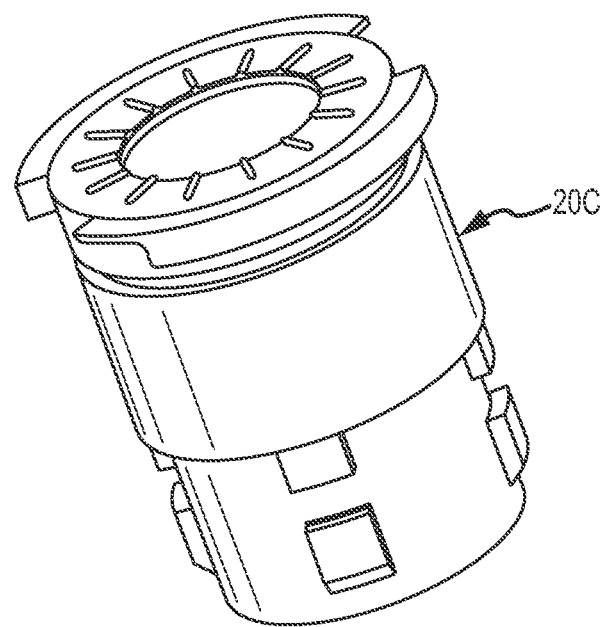
FIG. 1C
Figure 2:
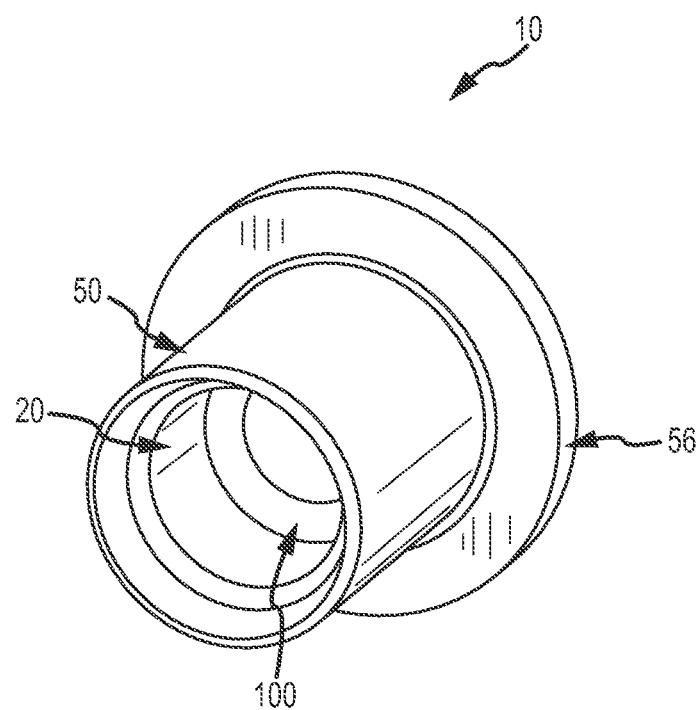
FIG. 2 is a bottom, perspective view of the cleaning head of FIG. 1.
Figure 4:
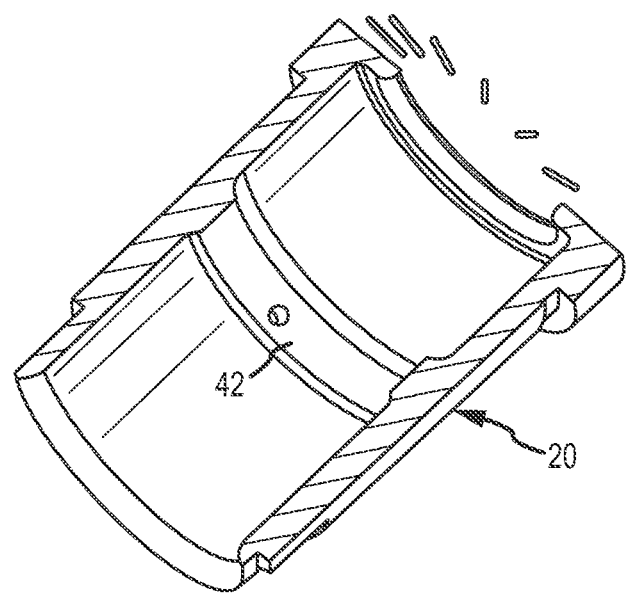
FIG. 4 is a cross-sectional view of a sleeve according to the invention.

Preferred sleeve 20 includes a top (or first end) 22, bottom (or second end) 24 and a generally cylindrical body 26 with an outer wall 28. A passage 30 is defined within the body 26. Bottom 24 has an opening 32. Top 22 has a circular covering 34 that covers top 22 and extends slightly beyond outer wall 28 to create a flange 34A. An opening 36, which is smaller than opening 32, is in the covering 34. As shown, the outer wall 28 includes mounting structures 38 that are known as "bayonet-style" mounting structures. These secure the sleeve into a cavity under (or behind) the surface of a pool, preferably within collar 50, and any suitable mounting structure may be used. Outer wall 28 also includes side apertures 40 for mounting pins 300, which is explained below. As shown in FIG. 4, sleeve 20 has an inner ledge 42. Different types of sleeves 20A, 20B and 20C are shown in FIGS. 1A, 1B and 1C, and each of these sleeves is configured to fit into a collar designed to receive each respective sleeve.

Collar 50 is preferably made of plastic, and preferably the same plastic as sleeve 20 and insert 100, or polycarbonate with about 30% fiberglass filler. The purpose of collar 50 is to be positioned beneath the surface of the pool and to receive sleeve 20 with insert 100 mounted therein. Preferably sleeve 20 can be removably mounted in collar 50 by a tool. Collar 50 and sleeve 20 can have any suitable structure for releasably connecting to one another and many such structures are known in the art.

The preferred collar 50 has a cylindrical body 52, a bottom edge 54 and an upper flange 56. Flange 56 extends outward from the top of collar 50 and its purpose is to be covered with concrete or other material used to make or secure the pool surface. In this embodiment, flange 56 has an outer lip 58 and grooves 60. Lip 58 and grooves 60 help to create a seal between collar 50 and the concrete or other material, and help to prevent water leaks around collar 50. As shown in this preferred embodiment, flange 56 is circular, lip 58 is higher (about twice as high) as ridges 62 that help define grooves 60.

Preferred insert 100 includes a body portion 102 that has a top (or first) body portion 104 and a bottom (or second) body portion 106. The function of insert 100 is to direct pressurized water to move debris to an area where it can be filtered from the water. As shown, the first body portion 104 is cylindrical, has a top 108, a wall 110 and an aperture 112 formed in wall 110. Second body portion 106 is generally cylindrical, is wider than first body portion 104, and has a top ledge 106A, and a wall 113 with teeth (also called grooves) 114. The purpose of teeth 114 is to help index the insert 100, as explained below. Second body portion 106 also includes a bottom 116 having an opening 118 that leads to a passage 120, which extends through the body 102 at least to aperture 112.

The bottom 116 of second body portion 106 is preferably sized to be just slightly smaller than the diameter of cavity 30 of sleeve 20. As shown, bottom 116 has a flange 116A to help reduce the space between second body portion 106 and the wall of cavity 30 while still enabling insert 100 to move freely within cavity 30. Flange 116A is positioned against inner ledge 42 when the insert 100 moves to its second position (as described below). This helps to prevent water leakage between insert 100 and sleeve 20.

First body portion 104 is configured and aligned so that it can extend through opening 32 and second body portion 106 as shown is too large to fit through opening 32. Insert 100 has a first position (shown in FIG. 1) in which it is retained within sleeve 20 and the aperture 112 does not extend beyond opening 36. Insert 100 has a second position (shown in FIG. 2) in which it extends partially beyond opening 36 and aperture 112 extends beyond opening 36.

Figure 5:
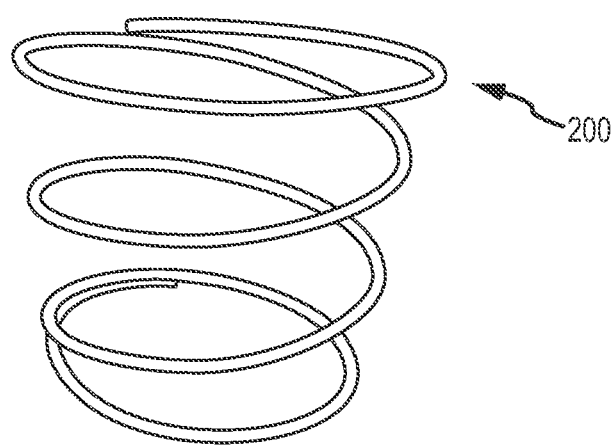
FIG. 5 is a perspective view of a biasing element according to the invention.
Figure 6:
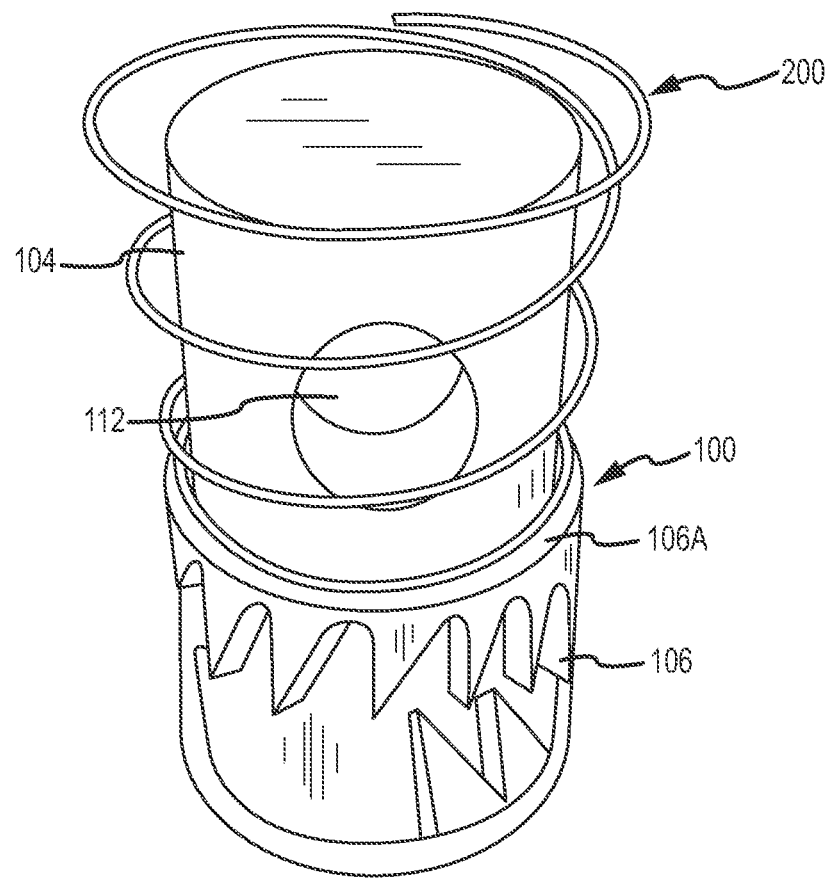
FIG. 6 is a perspective view of an insert according to the invention with the biasing element positioned thereon.

A biasing element 200 as shown in FIGS. 5 and 6 is preferably a conical spring 202 made of stainless steel. The purpose of biasing element 200 is to bias insert 100 towards its first position and any structure or device suitable for this purpose may be used. Conical spring 202 is configured to fit over first body portion 104 and rests (or is positioned) on top ledge 106A of second body portion 106. One advantage of using conical spring 202, as opposed to a standard, right cylindrical spring used in prior art heads is that the travel distance of the spring is less to create a suitable biasing force. Therefore, the insert 100 is smaller, thus requiring less material to make. Also, the collar and sleeve could be designed to be shorter, thus utilizing less material. A sleeve and insert according to the invention however, can be designed to retrofit existing collars.

Figure 3:
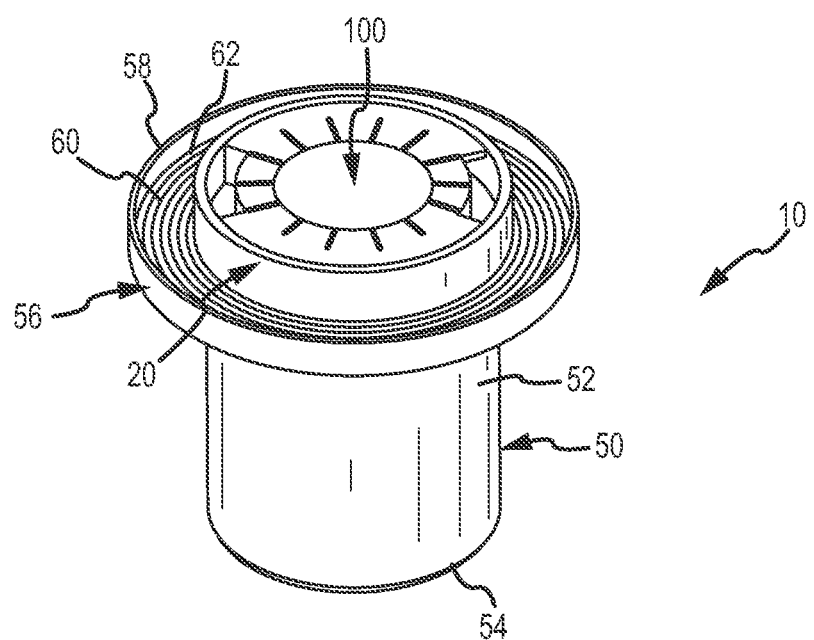
FIG. 3 is a perspective view of the cleaning head of FIG. 1 when in its first position.
Figure 3A:
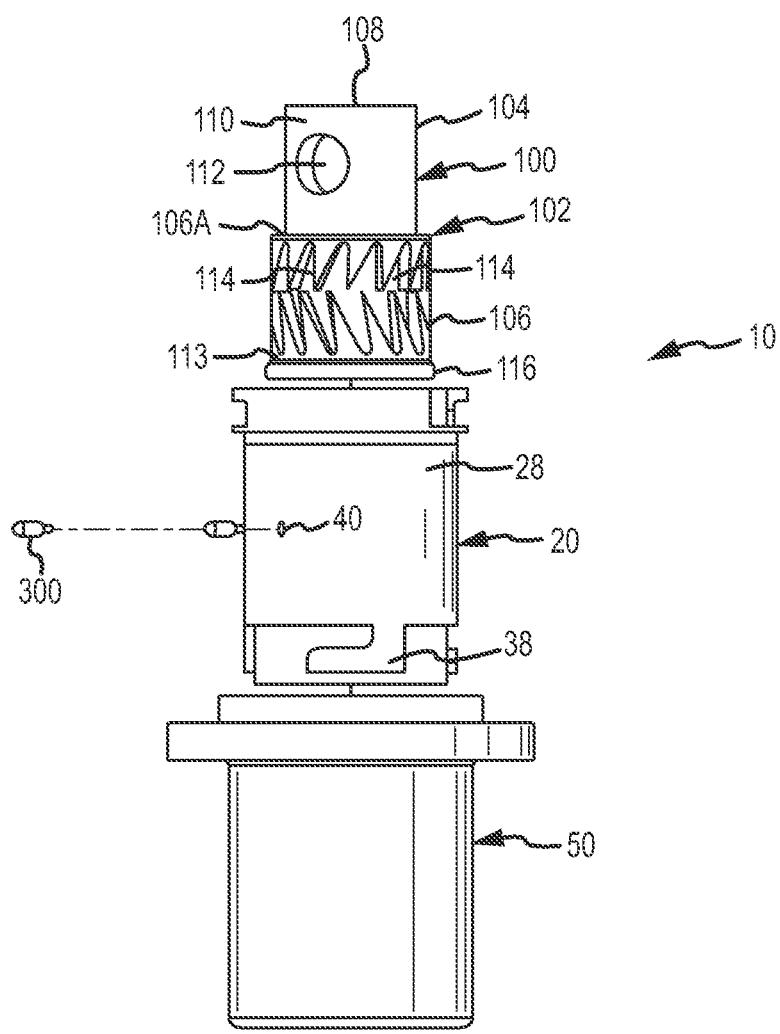
FIG. 3A is an exploded view of the cleaning head of FIG. 1 showing a sleeve, insert and biasing element.

One or more pins 300, best seen in FIG. 3, is inserted into each of the side apertures 40. Each pin 300 engages the grooves 114 on the outer surface of the first body portion 104 as the insert 100 moves from one or more of: its first position to its second position, or its second position to its first position. In this manner, the insert 100, and hence aperture 112, sequentially rotates and the aperture 112 releases pressurized water to different locations on the pool surface as it rotates to different positions. Pin(s) 300 are preferably formed of metal, such as steel.

When pressurized water is diverted from the valve to a pipe leading to a cleaning head 10 according to the invention, the pressurized water enters the bottom of the cleaning head where it enters opening 118, enters passage 120, and the force of the pressurized water overcomes the biasing force of element 300 and moves the insert 100 from its first position to its second position in which the aperture 112 extends beyond opening 36. Pressurized water then escapes from aperture 112 and moves debris on the pool surface towards an area where it can be filtered.

Having thus described embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A cleaning head for an in-floor pool cleaning system, the cleaning head comprising:
    (a) a sleeve with a top opening and a bottom opening;
    (b) an insert within the sleeve, the insert having (i) a first body portion and a second body portion, the second body portion being wider than the first body portion and having a bottom opening, the first body portion being configured to fit through the top opening of the sleeve, and the second body portion being configured to not fit through the top opening of the sleeve, (ii) an aperture in the first body portion of the insert and a passage extending from the bottom opening of the insert to the aperture, and an exterior surface and teeth formed in the exterior surface,
    (c) a conical spring surrounding at least part of the insert; wherein the insert has a first position wherein it is retained within the sleeve and a second position wherein the aperture of the first body portion extends beyond the top opening of the sleeve; and
    (d) at least one pin, wherein the teeth engage the pin so that the insert indexes to a different position as it moves from one or more of the group consisting of: (a) the second position to the first position, and (b) the first position to the second position.

2. The cleaning head of claim 1 wherein the conical spring surrounds at least part of the first body portion of the insert.

3. The cleaning head of claim 1 wherein the sleeve is comprised of plastic.

4. The cleaning head of claim 1 wherein the insert is comprised of plastic.

5. The cleaning head of claim 1 wherein the conical spring is comprised of stainless steel.

6. The cleaning head of claim 1 that further includes a collar into which the sleeve is releasably mounted.

7. The cleaning head of claim 6 wherein the collar includes a top flange having an outer, upward-extending lip.

8. The cleaning head of claim 6 that includes a top flange having grooves.

9. The cleaning head of claim 8 wherein the flange includes ridges and the outer edge is higher than the ridges.

10. The cleaning head of claim 6 wherein that includes a top flange having an outer edge and grooves.

11. The cleaning head of claim 1 wherein the sleeve includes an outer surface and a bayonet locking mechanism to retain the sleeve in the collar.

12. The cleaning head of claim 1 that includes a plurality of pins, each of which engage the teeth.

13. The cleaning head of claim 12 that further includes a side wall and one or more apertures in the side wall, each aperture for receiving a pin.

14. The cleaning head of claim 1 wherein the conical spring surrounds all of the first body portion of the insert.

\* \* \* \* \*